United States Patent [19]

Young

[11] 4,103,409

[45] Aug. 1, 1978

[54] ANGULARLY ADJUSTABLE FORCE IMPARTING TOOL

[76] Inventor: David W. Young, 421 Larkin, Akron, Ohio 44305

[21] Appl. No.: 749,750

[22] Filed: Dec. 13, 1976

[51] Int. Cl.² .............................................. B23P 19/04

[52] U.S. Cl. .......................................... 29/249; 29/255

[58] Field of Search .......................... 29/249, 254, 255; 81/52.35, 177 F, 177.8; 145/46; 403/229, 86

[56] References Cited

U.S. PATENT DOCUMENTS

| | | | |
|---|---|---|---|
| 695,022 | 3/1902 | Albertson | 403/86 |
| 1,013,410 | 1/1912 | Lynch | 403/229 |
| 2,742,936 | 4/1956 | Cooley | 403/86 |
| 3,065,528 | 11/1962 | Marshall | 29/249 |
| 3,564,697 | 2/1971 | Shalaty et al. | 29/249 |

FOREIGN PATENT DOCUMENTS

| | | | |
|---|---|---|---|
| 856,466 | 11/1970 | Canada | 403/229 |

*Primary Examiner*—James L. Jones, Jr.
*Attorney, Agent, or Firm*—Hamilton, Renner & Kenner

[57] ABSTRACT

A tool for imparting force to a mechanical element located in a confined area having an impact member for receiving and transferring force applied to it, an end member engageable with the mechanical element, and a connector rotatably joining the end member and the impact member, the end member and the impact member having mating faces at least one of which lies in a plane oblique to the force transmitting axis thereof for applying a force to the mechanical element from an angular position of the impact member relative to the end member by selective relative rotation of the impact member and the end member.

10 Claims, 5 Drawing Figures

ANGULARLY ADJUSTABLE FORCE IMPARTING TOOL

BACKGROUND OF THE INVENTION

The present invention relates to tools for imparting force to mechanical elements located in confined spaces such as an automotive tool useful in the mounting and demounting of valve assemblies in internal combustion engines. Such valve assemblies are well known and are utilized in association with the intake and exhaust ports in the cylinder heads of such engines. Each assembly includes a valve and at least one compression spring encircling the stem thereof and positioned between the cylinder head and the spring retainer which also encircles the valve stem. The retainer is held in a position limiting the outward extension of the spring, as by means of a segmental tapered collet, wedgingly locked between the retainer and the valve stem by the spring action.

Until relatively recently, valve removal had been a difficult operation requiring the use of a specially designed C-clamp and involving a tedious, time consuming operation which resulted in substantial labor costs. Additionally, a plurality of different sizes of C-clamps were normally required to accommodate different valve assemblies due to substantial variations in compression spring size and other characteristics. In order to overcome the deficiencies inherent in the use of such apparatus, I invented a tool for mounting and demounting automotive valve assemblies which is described in my U.S. Pat. No. 3,315,339, issued Apr. 25, 1967. With such a tool, to demount a valve assembly, the tool is positioned endwise on the retainer and the mechanic simply delivers a sharp blow thereto with a rubber mallet or the butt of his hand, providing an impact sufficient to depress the spring, release and retain the collet segments and thereby permit separation of the valve assembly from the cylinder head. By employing a removable mounting element as a part of the tool disclosed in my aforementioned patent, a valve assembly can readily be mounted again in operative position by utilizing the impact of a sharp blow delivered to the tool with the valve assembly parts appropriately repositioned.

Although either of these operations can be performed in a very short amount of time, successful use of the tool requires adequate clearance proximate the end of the tool, when it is positioned over the valve assembly, with respect to surrounding components of the engine compartment, such as power steering units, brake cylinders, fender liners or similar components, to permit delivery of sudden and sufficient force to the tool. In the great majority of engine compartment arrangements, it is readily possible to substantially coaxially align the tool disclosed in my aforementioned patent with the valve stems and effect application of the requisite force for mounting or demounting of the valve assemblies. However, on some makes and models of vehicles, particularly with certain accessories installed, it is impossible to properly align the tool and/or there is insufficient clearance to strike the tool with either a mallet or the hand with sufficient impact to depress the spring. Cocking or angling the axis of my prior tool relative to the valve assembly to obtain adequate clearance to deliver an appropriate blow produces less satisfactory results than when the tool is properly aligned with the valve assembly since damage to the valve components may be effected, the collet segments may not be retained by the tool and can be lost in the engine compartment, or adequate spring compression may not be possible.

SUMMARY OF THE INVENTION

It is therefore an object of the invention to provide a tool for imparting force to a mechanical element located in a confined area. It is therefore another object of the present invention to provide an improved tool as for the mounting and demounting of valve assemblies capable of equivalent operation in more limited or confined spaces than comparable prior art tools. It is a further object of the present invention to provide an improved tool for the mounting and demounting of valve assemblies which is rotatably adjustable through a plurality of operating angles, or in coaxial alignment, with respect to a valve assembly and particularly the valve stem thereof. It is an additional object of the invention to provide an improved valve tool which may be quickly and easily adjusted to adapt to the position of valve assemblies in all existing engine compartment arrangements. It is another object of the invention to provide such a valve tool which is of rugged construction, noncomplex, and containing few moving parts.

In general, a tool for imparting force to a mechanical element located in a confined area embodying the concepts of the present invention employs an impact member for receiving and transferring force, an end member engageable with the mechanical element, and a connector rotatably joining the end member and the impact member, the end member and the impact member having mating faces at least one of which lies in a plane oblique to the force transmitting axis thereof for applying a force to the mechanical element from an angular position of the impact member relative to the end member by selective relative rotation of the impact member and the end member.

DESCRIPTION OF THE PREFERRED EMBODIMENT

Figure 1:
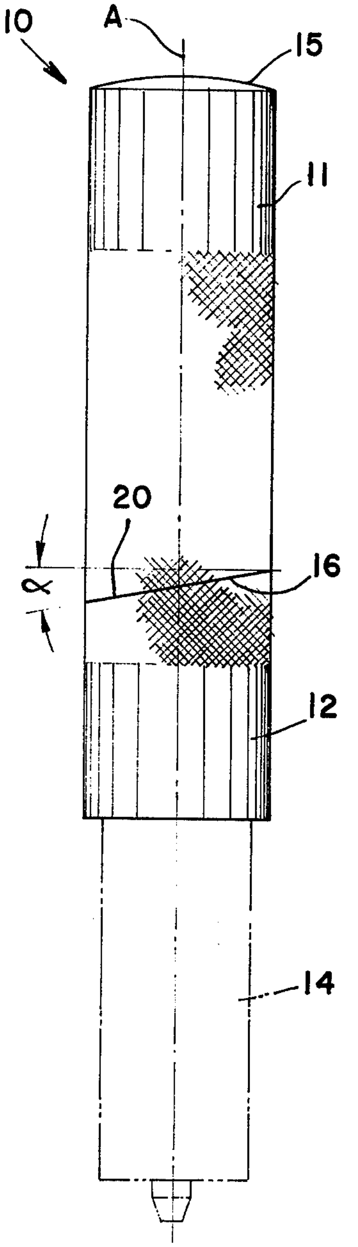
FIG. 1 is a side elevation of a valve tool embodying the concepts of the present invention depicting the impact and end members assembled and in coaxial alignment, with a valve mounting element, insertable into the tool, depicted in chain lines.
Figure 3:
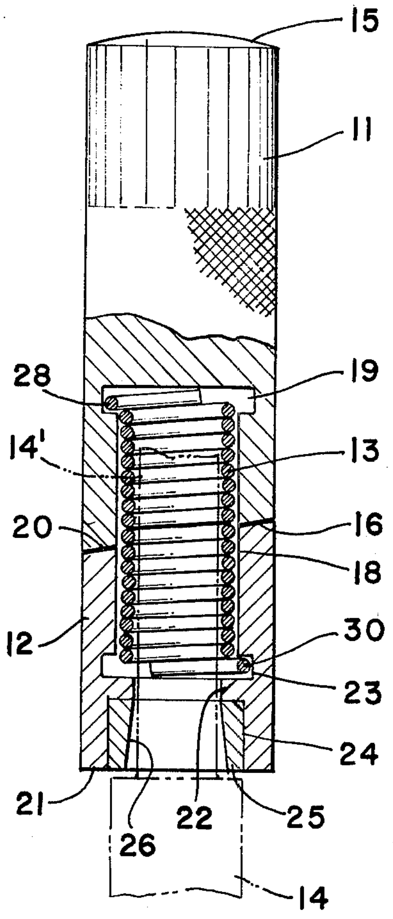
FIG. 3 is a side elevation partially in section and depicting the impact and end members assembled, the relationship of the spring connector thereto and the shaft of the valve mounting element inserted therein.

In general, an exemplary valve tool embodying the concepts of the present invention, generally indicated by the numeral 10, includes an impact member 11 and an end member 12. A valve mounting element 14 depicted in chain lines in FIGS. 1 and 3 is insertable into the tool 10. A complete description of these portions of tool 10 and the method of operation in the mounting and demounting of valve assemblies is contained in my aforementioned U.S. Pat. No. 3,315,339 to which reference may be made for further explanation of the structure and operation of the tool, except for the differences hereinafter denoted.

Figure 2:
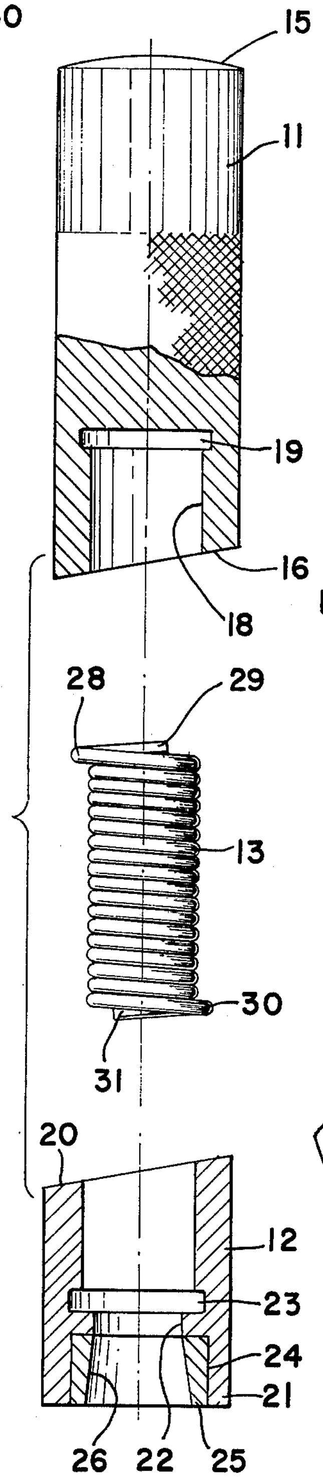
FIG. 2 is an exploded view of the tool of FIG. 1, partially in section and depicting, respectively from top to bottom, the impact member, a spring connector and the end member.

The impact member 11 is preferably constructed of metal and of an elongated generally cylindrical shape with a somewhat rounded outer end 15 for impacting with a rubber mallet or the butt of the hand. The axially opposite end of impact member 11 terminates in a flat face 16 which is somewhat oblique to the longitudinal axis A, of the tool 10. As seen in FIGS. 2 and 3, a cylindrical passage 18 extends from flat face 16 a distance into the impact member 11. The passage 18 is preferably coaxial of impact member 11 and has a small recess 19 of greater diameter or radial dimension than that of the passage 18.

The end member 12 is also metal and of the same general configuration as the impact member 11, although it may advantageously be somewhat shorter than the latter. The end member terminates in a flat face 20, also oblique to the longitudinal axis A of the tool 10 which may be formed as a cut-off of the valve demounting tool part described in my above referenced prior patent.

As depicted in FIG. 1, the faces 16 and 20 of the members 11 and 12, respectively, may be positioned so that both members 11 and 12 of the tool 10 have their force transmitting axes substantially aligned with the longitudinal axis A. The impact member 11 at its axial extremity opposite the flat face 20 has an engaging surface 21 which is generally perpendicular to the force transmitting axis to permit proper alignment of the tool 10 against a valve spring retainer. A cylindrical passage 22 which may be of the diameter of passage 18 of impact member 11 extends through end member 12 substantially coaxially thereof, as seen in FIG. 2. A first recess 23 of greater diameter than the passage 22 is provided preferably approximately intermediately of the passage 22 for a purpose hereinafter detailed.

A second recess 24 extends inwardly from the engaging surface 21 and is provided to receive a magnetic sleeve 25 which may be press fit into the recess 24 or threadably engaged therewith. The sleeve 25 has a cylindrical inner wall 26 having a diameter substantially the same as that of the passages 18 and 22. The inner wall 26 encompasses the segmental collets which lock the spring retainer on the valve stem. During removal of a valve assembly from a cylinder head, using the tool 10, the valve spring is momentarily depressed, freeing the segmental collets which are readily attracted to and held by the inner wall 26 of the magnetic sleeve 25. With the collets thus withdrawn from the conventional annular seating groove in a valve stem, the spring and retainer are free to be removed therefrom.

Figure 5:
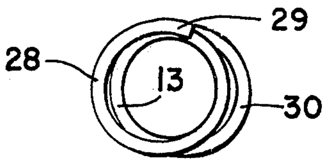
FIG. 5 is a top plan view of the spring connector.

The impact member 11 and end member 12 are joined and have their faces 16 and 20 longitudinally maintained in mating surface engagement subject to selective relative rotation by a spring connector 13. The inner diameters of the passages 18 and 22 of members 11 and 12 which accommodate the spring 13 that is a coil configuration are preferably of substantially the same diameter and of approximately the same or slightly greater diameter than the radially outer diameter of the coil spring connector 13. As depicted in FIGS. 2 and 5, a first catch 28 is preferably formed proximate the one end and as part of one or more convolutions of the spring 13 so as to partially extend beyond the outer diameter of the spring 13. The very tip 29 of the spring 13 is preferably aligned with the convolutions thereof rather than spiraling generally away from the spring 13. Similarly, a second catch 30 is formed proximate the other end and as part of one or more convolutions and extends partially beyond the outer diameter of the spring 13, and its tip 31 is aligned with the convolutions thereof.

During assembly of the tool 10, the impact member 11 is urged over the spring 13 until catch 28 is received within the recess 19 of the passage 18. Although the catch 28 will be slightly deflected by the bore of the passage 18, it will fully expand within the recess 19 thereby prohibiting unintentional separation of the spring 13 from the impact member 11. Likewise, the other end of spring 13, with the catch 30, is urged into passage 22 of end member 12 until the catch 30 expands within the first recess 23 provided in end member 12.

The combined length of the passage 18 and passage 22 to the recess 23 is preferably as long or slightly longer than the overall length of spring 13 from tip 29 to tip 31 so that when the tool 10 is assembled, as depicted in FIG. 3, the faces 16 and 20 of members 11 and 12, respectively, are maintained in relative contact, there being a slight tension upon the spring 13 tending to produce contraction. If necessary for assembly, the members 11 and 12 may be slightly relatively rotated so that the spring 13 is longitudinally extended by frictional engagement with the passages 18 and 22 to effect seating of the catches 28 and 30 in the recesses 19 and 23.

When the impact member 11 and end member 12 are in vertical alignment, as depicted in FIG. 3, the tool 10 is ready for normal use in the demounting or removal of valve assemblies according to my earlier above-referenced patent. As such, the tool 10 is located so that the engaging surface 21 of the end member 12 is securely positioned upon the upper surface of the spring retainer of a valve assembly. A sudden blow of the type hereinabove described to the rounded end 15 of the tool 10 momentarily depresses the valve spring and removes the collet segments, thereby permitting rapid disassembly of the various component parts maintaining the valve operatively assembled within the cylinder head.

Figure 4:
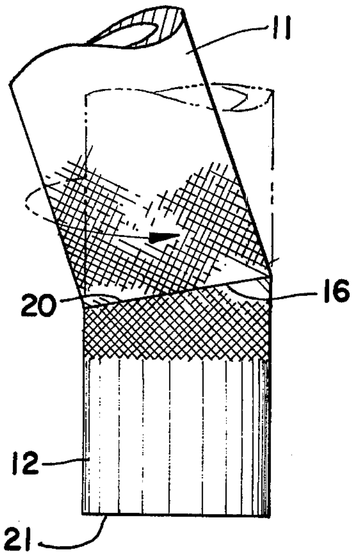
FIG. 4 is a fragmentary side elevation of the tool depicting rotation of the impact member with respect to the end member and the corresponding angular displacement of the force transmitting axes thereof from the coaxial alignment depicted in FIG. 1.

In the event that there is insufficient clearance in which to align the tool 10 with the valve retainer and yet apply a force thereto, as with a mallet or the hand, the end member 12 and the impact member 11 may be rotated with respect to one another as depicted in FIG. 4. Owing to the oblique inclination of the faces 16 and 20, the tool 10 assumes a plurality of positions with the axes of members 11 and 12 angularly displaced from the aligned longitudinal orientation of FIG. 1. It has been determined that if the oblique inclination of faces 16 and 20 is an angle $\alpha$ of approximately 10° with respect to a perpendicular to the longitudinal axis A, suitable access is afforded with respect to known existing engine compartment arrangements. An angle of approximately 10° permits angular displacements of an infinite variety between the impact member 11 and end member 12 from 0 to 20°. As can be seen from FIG. 3, the shank 14' of valve mounting element 14 may be of substantially lesser diameter than the inner diameter of the spring member 13 and the inner wall 26 of the sleeve 25 such that the shank 14' may be readily accommodated within the spring 13 throughout the extent of relative rotation producing the angular displacement between the axes of the impact member 11 and end member 12. In such an angular position which may be selected with the tool in place, the operator is able to locate the engaging surface 21 of tool 10 squarely upon the spring retainer of a valve assembly and yet apply a force against the impact member 11 at an angularity providing sufficient clearance to strike the tool 10.

The tension of the spring 13 maintains the members 11 and 12 in firm contact one to the other, whereas the small clearance between the spring diameter and the diameter of passages 18 and 22 prohibits inadvertent rotation of the members 11 and 12. The members 11 and 12 may be repeatedly rotated without separation inasmuch as the catches 28 and 30 of the spring 13 remain within the recesses 19 and 23 under normal operation of the tool 10. Separation of the members 11 and 12, if desired, may be accomplished by twisting each member while concurrently pulling them away from each other.

As described in my U.S. Pat. No. 3,315,339, to remount a valve assembly, a valve mounting element 14 is utilized. The mounting element 14 has the extending shank 14' which is received within the spring 13 whether the tool 10 is in a straight configuration or in the inclined configuration for the reasons described hereinabove.

It can thus be seen that the above-disclosed tool carries out the objects of the invention. Since various modifications in details, materials and arrangements of parts are within the spirit of the invention herein disclosed and described, the scope of the invention is to be limited solely by the scope of the attached claims.

I claim:

1. A tool for imparting force to a mechanical element located in a confined area comprising, an impact member for receiving and transferring force applied thereto, an end member having a tapered recess in an outer end thereof engageable with the mechanical element, said end member and said impact member having mating faces at least one of which lies in a plane oblique to the force transmitting axis thereof for applying a force to the mechanical element from an angular position of said impact member relative to said end member by selective relative rotation of said impact member and said end member, and a coil spring connector engaging and rotatably joining said end member and said impact member and maintaining said mating faces of said end member and said impact member in force transmitting engagement.

2. A tool as set forth in claim 1 wherein said impact member and said end member have passages and said coil spring connector is a cylindrical configuration accommodated in said passages.

3. A tool as set forth in claim 2 wherein the passages in said impact member and said end member have recesses therein and said spring has catches for engaging said recesses and moving therein during the relative rotation of said impact member and said end member.

4. A tool as set forth in claim 3 wherein said catches are radially extending convolutions of said spring which engage the recesses which are enlarged bores in said passages.

5. A tool as set forth in claim 4 wherein the outer diameter of said spring frictionally engages said passages.

6. A tool as set forth in claim 4 wherein said recesses are spaced a distance such that when said mating faces are in engagement and said catches are engaged in said recesses said spring is maintained in tension.

7. A tool as set forth in claim 1 wherein both of the mating faces of both said end member and said impact member lie in planes oblique to the force transmitting axes thereof.

8. A tool as set forth in claim 7 wherein said mating faces are oriented at an angle of approximately 10° with respect to a plane perpendicular to the force transmitting axes thereof.

9. A tool as set forth in claim 1 wherein said impact member and said end member have passages which are aligned by said coil spring connector such that the shank of another tool element is insertable within said coil spring connector.

10. A tool as set forth in claim 9 wherein the shank of another tool element is of substantially lesser diameter than the inner diameter of said coil spring connector to permit the angular positioning of said impact member and said end member with the shank inserted therein.

* * * * *